US008577202B2

(12) United States Patent
Sikora et al.

(10) Patent No.: US 8,577,202 B2
(45) Date of Patent: Nov. 5, 2013

(54) METHOD FOR PROCESSING A VIDEO DATA SET

(75) Inventors: Thomas Sikora, Berlin (DE); Sebastian Knorr, Berlin (DE)

(73) Assignee: Imcube Media GmbH, Berlin (DE)

( * ) Notice: Subject to any disclaimer, the term of this patent is extended or adjusted under 35 U.S.C. 154(b) by 352 days.

(21) Appl. No.: 12/598,607

(22) PCT Filed: May 2, 2008

(86) PCT No.: PCT/DE2008/000742
§ 371 (c)(1),
(2), (4) Date: Feb. 22, 2010

(87) PCT Pub. No.: WO2008/135024
PCT Pub. Date: Nov. 13, 2008

(65) Prior Publication Data
US 2010/0158482 A1    Jun. 24, 2010

(30) Foreign Application Priority Data

May 4, 2007    (DE) .......................... 10 2007 021 518

(51) Int. Cl.
*H04N 5/92*    (2006.01)

(52) U.S. Cl.
USPC .......................................... 386/239; 386/248

(58) Field of Classification Search
USPC ............ 348/41, 44, 48, 50, 52, 55, 57, 58, 60
See application file for complete search history.

(56) References Cited

U.S. PATENT DOCUMENTS

| | | | |
|---|---|---|---|
| 6,965,379 B2 | 11/2005 | Lee et al. | |
| 7,002,769 B2 * | 2/2006 | Kagami et al. | 360/77.02 |
| 2003/0185116 A1 * | 10/2003 | Ohbi et al. | 369/47.14 |
| 2006/0104535 A1 * | 5/2006 | Varekamp | 382/260 |
| 2006/0164509 A1 * | 7/2006 | Marshall et al. | 348/42 |
| 2006/0164517 A1 * | 7/2006 | Lefebure | 348/222.1 |
| 2006/0232666 A1 | 10/2006 | Op De Beeck et al. | |
| 2007/0110338 A1 * | 5/2007 | Snavely et al. | 382/305 |

(Continued)

OTHER PUBLICATIONS

Pollefeys, Marc; Visual Modeling with a Hand-Held Camera; International Journal of Computer Vision 59(3), 207-232, 2004.

(Continued)

*Primary Examiner* — Huy T Nguyen
*Assistant Examiner* — Eileen Adams
(74) *Attorney, Agent, or Firm* — Schmeiser, Olsen & Watts, LLP (57) ABSTRACT

The invention relates to a method for processing a video data set, which comprises a sequence of original images, into a modified video data set which, in addition to the sequence of original images, comprises virtual images derived therefrom in one or more data processing units, wherein an SfM analysis is carried out for each of the original images and a respectively assigned original position of a recording device which was used to record the original image, virtual positions are formed for a recording device for recording virtual images, for each virtual position of the recording device with the associated virtual initial image, a respective assignment is created to at least one of the original positions of the recording device with the associated original image, for each assignment, a homography is determined between the virtual initial image and the associated original image, and for each virtual initial image, a virtual final image is formed from the associated original image in that the original image is formed in the associated final image using the respectively determined homography.

6 Claims, 8 Drawing Sheets

(56) References Cited

U.S. PATENT DOCUMENTS

2007/0132967 A1* 6/2007 Damera-Venkata et al. . 353/121
2008/0031327 A1* 2/2008 Wang et al. ............. 375/240.12
2008/0043022 A1* 2/2008 Ishihara ........................ 345/428

OTHER PUBLICATIONS

Fehn, Christoph; Depth-Image-Based Rendering (DIBR), Compression and Transmission for a New Approach on 3D-TV; SPIE-IS&T/ vol. 5291; 93-104.
Park, Min Kyu et al.; Super-Resolution Image Reconstruction a Technical Overview; IEEE Signal Processing Magazine, vol. 20, No. 3, May 1, 2003, 21-36.
Knorr, Sebastian et al.; Super-Resolution Stereo- and Multi-View Synthesis from Monocular Video Sequences; Sixth International Conference on 3-D Digital Imaging and Modeling, 2007 IEEE; 8 pages.
Knorr, Sebastian et al.; From 2D-to-Stereo-to Multi-View Video; 3DTV Conference, 2007, IEEE, May 7, 2007; 4 pgs.
Fehn, Christoph et al.; 3D-TV Using Depth-Image-Based Rendering (DIBR); Image Processing Department; Picture Coding Symposium; Dec. 15, 2004; 6 pages.
Evers-Senne, J-F et al.; Image-Based Rendering of Complex Scenes from a Multi-Camera Rig; IEE Proc-Vis. Image Signal Process, vol. 152, No. 4, Aug. 2005; 470-480.
Kunter, Matthias et al; Super-Resolution Mosaicing Using Embedded Hybrid Recursive Flow-Based Segmentation; Information Communications and Signal Processing; Dec. 6, 2005; IEEE, 1297-1301.
Grau, O. et al.: The ORIGAMI Project: Advanced Tools for Creating and Mixing Real and Virtual Content in Film and TV Production; IEE Proc-Vis. Image Signal Process, vol. 152, No. 4, Aug. 2005; 454-469.
Kimura, Kenji et al.; Video Synthesis at Tennis Player Viewpoint from Multiple View Videos; IEEE Virtual Reality 2005; 281-282.
Hartley, Richard et al; Multiple View Geometry in Computer Vision; Published by the Press Syndicate of the University of Cambridge, First Published 2000, 672 pgs.
Pollefeys, Marc; Tutorial on 3D Modeling from Images; Jun. 26, 2000; 134 pgs.; Mar. 1992.
Tomasi, Carlo et al.; Shape and Motion from Image Streams: a Factorization Method; Journal of Computer Vision, 1992; 34 pgs.
Knorr et al.; A Modular Scheme for 2D/3D Conversion of TV Broadcast; 3rd Int. Symposium on 3D data processing, visualization, and transmission (3DPVT), Chapel Hill, 2006; 8 pgs.
Rotem et al.; Automatic Video to Stereoscopic Video Conversion; SPIE Proceedings, vol. 5664, Mar. 2005, pp. 198-206.
Harris, Chris et al.: A Combined Corner and Edge Detector, in 4th Alvey Vision Conference, pp. 147-151, 1988.
Tomasi et al.: Detection and Tracking of Point Features, Apr. 1991; Technical Report CMU-CS-91-132, Carnegie Mellon University Technical; 38 pgs.
Fischler, M. et al.: Random Sample Consensus: A Paradigm for Model Fitting with Applications to Image Analysis and Automated Cartography; Graphics and Image Processing; 1981 ACM; pp. 381-395.
Triggs et al.; Bundle Adjustment—A Modern Synthesis, in "Vision Algorithms: Theory and Practice", Springer-Verlag, 2000; pp. 1-71.
Hartley, et al.; Triangulation; Computer Vision and Image Understanding; 1997; 21 pgs.
Zhang et al.; Stereoscopic Image Generation Based on Depth Images; 2004 International Conference on Image Processing (ICIP); pp. 2993-2996.
Kim et al.; Synthesis of a high-resolution 3D-stereoscopic image pair from a high-resolution monoscopic image and a low-resolution depth map; Proc. of the SPIE; 1998; 11 pgs.
Moustakas et al.; Stereoscopic Video Generation Based on Efficient Layered Structure and Motion Estimation From a Monoscopic Image Sequence; IEEE Transactions on Circuits and Systems for Video Technology, vol. 15, No. 8, Aug. 2005; pp. 1065-1073.

* cited by examiner

METHOD FOR PROCESSING A VIDEO DATA SET

The invention relates to a method for processing a video data set, which comprises a sequence of original images, into a modified video data set which, in addition to the sequence of original images, comprises virtual images, in one or more data processing units.

BACKGROUND TO THE INVENTION

Methods of this type for processing video data sets are used inter alia for creating 'multiple view videos from monocular videos. Video sequences of this type can be used, for example, in conjunction with 3-D displays or autostereoscopic displays in order to convey to the observer an impression of depth in the image being observed. The method for processing video data sets effectively transforms video sequences for two-dimensional imaging into video sequences for three-dimensional imaging. A variety of methods have been proposed for this purpose. The existing methods can be roughly divided into methods for generating a complete 3-D model for the scene captured in the image (Hartley et al., "Multiple view geometry", Cambridge University Press, UK, 2003; Pollefeys: "Tutorial on 3D modeling from images", European Conf. on Computer Vision (ECCV), 2000; Tomasi et al., Journal of Computer Vision 9(2), pp. 137-154, 1992; Knorr et al., "A modular scheme for 2D/3D conversion of TV broadcast", 3rd Int. Symposium on 3D Data Processing, Visualization, and Transmission (3DPVT), Chapel Hill, USA, 2006) and methods wherein a stereoscopic representation is generated, either by means of calculations of planar transformations (see Rotem et al., Proc. of the SPIE: Stereoscopic Displays and Virtual Reality Systems XII, vol. 5664, pp. 198-206, March 2005; WO 02/091754) or with the aid of a depth analysis for each image in the video sequence, wherein DIBR technology (DIBR—'Depth-Image-Base-Rendering'); (K. Moustakas et al., IEEE Trans. on Circuits and Systems for Video Technology, vol. 15, No. 8, pp. 1065-1073, August 2005; K. T. Kim et al., "Synthesis of a high-resolution 3D stereoscopic image pair from a high-resolution monoscopic image and a low-resolution depth map", Proc. of the SPIE: Stereoscopic Displays and Applications IX, San José, USA, 1998; C. Fehn, "Depth-image-based rendering (DIBR), compression and transmission for a new approach on 3D-TV", Proc. of the SPIE: Stereoscopic Displays and Virtual Reality Systems XI, San José, USA, 2004; L. Zhang et al., "Stereoscopic image generation based on depth images", IEEE Int. Conf. on Image Processing (ICIP), Singapore, 2004; WO 2005/013623) is used.

The methods which attempt to create a complete 3-D model of a recorded scene include SfM analysis or SfM technology (SfM—'Structure from Motion'); (Pollefeys: "Tutorial on 3D modeling from images", European Conf. on Computer Vision (ECCV), 2000). With the aid of SCM analysis, in a freely selectable coordinate system, the spatial coordinates of the recording device, for example, a camera used for recording the images of the video sequence are determined. At the same time, using this analysis, in the chosen coordinate system the spatial coordinates of reference image points in the 2-D images of the existing video sequence can be calculated. However, SfM technology cannot supply dense and exact 3-D modelling, although this is required for the generation of stereoscopic images in high quality. The DIBR method requires dense depth estimation, which is time-consuming and error-laden.

In the document "The ORIGAMI Project: Advanced tools for creating and mixing real and virtual content in film and TV production", in: IEE Proceedings—Vision, Image and Signal Processing, August 2005, vol. 152, No. 4, pp. 454-469, ISSN: 1350-245X by O. Grau, R. Koch, F. Lavagetto, A. Sarti, S. Tubaro and J. Woetzel, a method for processing a video data set is described wherein virtual images derived from the original images are added to the original images of the video data set, wherein an SfM analysis is carried out, at least for the "environment portion" of the original images, by which means the initial position of a recording device used to record the original images is determined.

In the document "Video Synthesis at Tennis Player Viewpoint from Multiple View Videos", in: IEEE Proceedings—Virtual Reality 2005, March 2005, pp. 281-282, ISSN: 1087-8270, ISBN: 0-7803-8929-8 by K. Kimora and H. Saito, a method for generating virtual views of a tennis game is described. In this document virtual images are derived from original images, wherein an original image is assigned to a virtual image based on corresponding points in the original image and a homography is determined for a virtual initial image and the virtual final image is generated using this homography on the original image. With the known method, an SfM analysis of the initial images and a respective associated original position of a recording device used to record the original images is carried out.

SUMMARY OF THE INVENTION

It is an object of the invention to provide an improved method for processing a video data set comprising a sequence of original images to a modified video data set which comprises virtual images in addition to the sequence of original images, in one or more data processing units, with which multiple view video sequences can be generated from monocular video sequences without requiring a complex dense depth analysis of the scenes represented in the images.

This aim is achieved according to the invention with a method as per independent claim 1. Advantageous embodiments of the invention are the subject matter of the dependent claims.

The invention makes use of the concept, when processing a video data set with original images, of originally subjecting it to a SfM analysis. Additionally, virtual initial images are generated to each of which a virtual position of a recording device, for example a camera, used to record the virtual initial image is assigned. Subsequently, at least one of the virtual positions of the recording device for the virtual initial images is assigned to each original position of the recording device to which a respective original image belongs. Thereafter, for each of the assignments thus determined, a homography is determined between the original image and the associated virtual initial image. Each homography comprises a calculated planar transformation between the original image and the associated virtual initial image. Each homography can then be used to generate a complete virtual image, specifically a virtual final image, from the respective associated original image. The modified video data set then comprises the generated virtual final images alongside the original images. The modified video data sequence can be used with the aid of a suitable reproduction device to generate a stereoscopic 3-D representation of the scene depicted in the images.

The advantages of the invention over the methods for creating a complete 3-D model lie, firstly, in the reduced computation complexity and, secondly, in the avoidance of interfering artefacts in the stereoscopic 3-D representation, which arise when virtual images are generated from previously estimated 3-D models. Compared with the methods which DIBR technology use, the advantages lie therein that the use of DIBR technology is possible only in conjunction with the additional information of the depth for each image point of all the original images of the video data set. However, determination of the depth information of all the image points is very computation-intensive and error-laden. In addition, an increased in the resolution (super-resolution) is not possible when generating a virtual image with DIBR technology.

In an advantageous embodiment of the invention, it is provided that the assignments are formed in that, in each case, at least one laterally adjacent original position of the recording device with the associated original image is assigned to the virtual positions of the recording device with the associated virtual initial image.

A convenient development of the invention provides that the at least one laterally adjacent original position of the recording device is formed at a lateral distance of approximately 64 mm from the assigned virtual position of the recording device. The proposed distance corresponds to the average spacing of the eyes.

In a further development of the invention, it can be provided that the virtual positions of the recording device for recording the virtual images are formed at essentially equidistant separations from the original positions.

In a preferred embodiment of the invention, it is provided that for the original positions, in each case, a plurality of virtual positions of the recording device is formed which are optionally spaced mutually equidistant.

An advantageous embodiment provides that the modified video data set is converted into a modified video data set with images of increased resolution in that using the respectively determined homographies from the sequence of original images and the additional virtual images, a sequence of images is created with increased resolution that is higher than an original resolution of the original images and the additional virtual images.

DESCRIPTION OF PREFERRED EMBODIMENTS OF THE INVENTION

The invention will now be described in greater detail using exemplary embodiments and making reference to the drawings, in which.

The analysis of the video data set with original images to be processed, which serves as the starting point of the method, by means of SfM analysis will now be described in greater detail. It is the aim of the SfM analysis to determine outer and inner parameters of the recording device (camera) used for the recording of the original images comprising the video data set to be processed and the spatial coordinates of at least reference image points in the original images of the video data set in a freely selectable coordinate system. The SfM analysis requires a relative movement between the static scene to be recorded and the recording device.

In a starting step, relationships are sought between the original images of the video data set. Such geometrical relationships, which are also designated 'epipolar geometry', can be determined from a sufficient number of reference image points in the original images (see, for example, Pollefeys: "Tutorial on 3D modeling from images", European Conf. on Computer Vision (ECCV), 2000). When the original images are put into relationship to one another, projection matrices can be calculated for the recording device in that singular value decomposition is used (see e.g. Hartley et al., "Multiple view geometry", Cambridge University Press, UK, 2003). When the correspondence between the reference image points in the original images and the projection matrices have been determined, the spatial coordinates for the previously determined reference image points can be calculated using triangulation (see e.g. R. Hartley et al., Computer Vision and Image Understanding, 68(2): 146-157, 1997). For a more precise determination of the calculated parameters, a 'bundle adjustment' can optionally be used (see e.g. B. Triggs et al., "Bundle adjustment—a modern synthesis", in "Vision Algorithms: Theory & Practice", Springer-Verlag, 2000).

The method steps of SfM analysis which were roughly outlined above, will now be described in greater detail.

A. Determination of Reference Image Points and Image Selection

Reference image points or reference image objects can be any desired elements from the original images. Preferably, image elements which do not change are selected in the images of the video data set. Various methods for selecting suitable reference image points or reference image objects are known. The Harris Detector (see e.g. C. G. Harris et al., "A combined corner and edge detector", in 4th Alvey Vision Conference, pp. 147-151, 1988) is one of the most often cited detectors, with the help of which corner points or edges in images are found based on gradients in the intensity values. These corner points, which are characterised by steep gradients in all directions, can be more easily found and/or followed as reference image points in the images of the video data set (see e.g. C. Tomasi et al., "Detection and tracking of point features", Technical Report CMU-CS-91-132, Carnegie Mellon University Technical, 1991).

B. Multiple View Reconstruction

Following the selection of key images from among the original images, specifically images which will initially be used for the SfM analysis, and determination of the reference image elements, a fundamental matrix F is then calculated between two of the first key images of the video data set. The RANSAC technology (RANSAC—"RANdom SAmple Consensus"; M. Fischler et al., Communications of the ACM, pp. 381-385, 1981) provides a robust method which selects part of the reference image elements (inliers) for the calculation of F. Then projection matrices P1 and P2 are determined by means of singular value decomposition. The reference coordinate system is aligned with the position of the first recording device (see e.g. Pollefeys: "Tutorial on 3D modeling from images", European Conf. on Computer Vision (ECCV), 2000). When the projection matrices P1 and P2 are known, the spatial coordinates of the reference image elements are found by means of triangulation (see e.g. R. Hartley et al., Computer Vision and Image Understanding, 68(2): 146-157, 1997).

The next step concerns the updating of the spatial coordinates of the reference image elements and of the movement of the recording device. Firstly, the projection matrix is determined for the recording device for the next key image in that the already existing 3-D to 2-D reference image element correspondences are used as is per se known (see e.g. Pollefeys: "Tutorial on 3D modeling from images", European Conf. on Computer Vision (ECCV), 2000). Then the spatial coordinates for the reference image elements and the matrix of the recording device can be refined by means of further 3-D to 2-D reference image element correspondences. This procedure is repeated for all the key images from the group of original images in the video data set that is to be processed.

A final fine adjustment of the spatial coordinates of the reference image elements can then be carried out by means of global non-linear minimising techniques for all the original images of the video data set that is to be processed, and this is also known as 'bundle adjustment' (see e.g. B. Triggs et al., "Bundle adjustment—a modern synthesis", in "Vision Algorithms: Theory & Practice", Springer-Verlag, 2000).

C. Self-Calibration

If the internal settings for the recording device used for recording the original images (internal camera(-calibration) parameters) are unknown, which is often the case with TV transmissions, private films or cinema films, a self-calibration procedure must be carried out. From the previously determined projection matrices, the internal camera matrices $$K_i = \begin{bmatrix} \alpha_x & s & x_0 \\ 0 & \alpha_y & y_0 \\ 0 & 0 & 1 \end{bmatrix}$$

with the internal parameters of the original recording device ($\alpha_x$: focal length in image point coordinates in the x-direction, $\alpha_y$: focal length in image point coordinates in the y-direction, S: shear parameter, $x_0$: x-coordinate of the main point of the recording device and $y_0$: y-coordinate of the main point of the recording device), the rotation matrices $R_i$, which contain the parameters for the orientation of the original recording devices, and the positions $C_i$ of the original recording devices are calculated (see e.g. Hartley et al., "Multiple view geometry", Cambridge University Press, UK, 2003 or Pollefeys: "Tutorial on 3D modeling from images", European Conf. on Computer Vision (ECCV), 2000).

With the aid of the SfM analysis described above, the following information is now available: spatial coordinates of the selected reference image elements in the original images of the video data set to be processed, spatial coordinates for the positions and orientations of the recording device used for recording the original images relative to the selected coordinate system (external camera parameters) and the internal settings for the recording device used for recording the original images (internal camera (-calibration) parameters). Starting from this point, additional virtual images are then generated with associated positions of the recording device used, which will be described in greater detail below. The virtual images are initially generated as virtual initial images for which only a limited number of virtual image points exists, and these relate to the aforementioned reference image points.

Making use of the result of the SfM analysis, the spatial reference image points are projected into the virtual initial images. The result is that each of the virtual initial images is a modified version of the reference image elements in the original images.

Making use of a homography that has been determined between a virtual initial image and an associated original image, which is carried out in a subsequent step (see, in particular, section E below), a complete virtual image, that is a virtual final image, can then be created in that all the image points or image elements from the original image are projected into the associated virtual final image. In this way, one or more virtual final images can be created for an original image, depending on how many virtual initial images were assigned to an original image, which will be described in greater detail below.

D. Determining the Positions of the Virtual Recording Devices (Step 102)

The arrangement of the virtual recording device requires the definition of a horizontal separation between the images, known as the 'screen parallax values'. The mean separation of human eyes is 64 mm, that is, for each original recording device at least one (or more for corresponding 3-D output devices) virtual recording device must be determined wherein the horizontal separation is approximately 64 mm If a plurality of virtual recording devices are generated, then the separations between the virtual recording devices must be equidistantly spaced at approximately 64 mm in each case.

Figure 3:
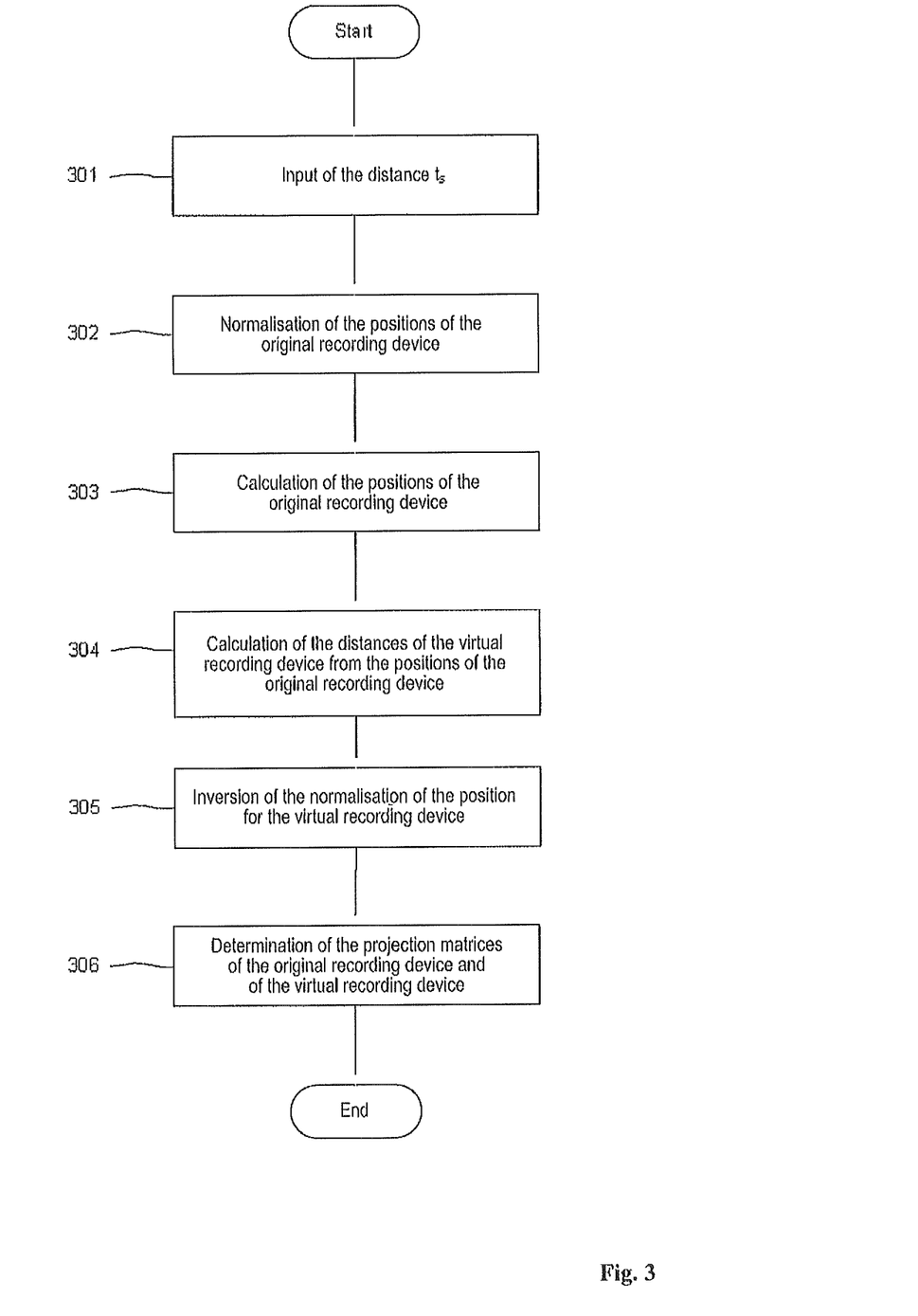
FIG. 3 shows a flow diagram to illustrate a method for determining a position of a virtual recording device at a distance from an original recording device.

The determination of the position of a virtual recording device at a distance of 64 mm from an original recording device will now be described in greater detail (see FIG. 3).

SfM analysis provides a relative relation between the positions and orientations of the original recording device and the reference image elements in a selected coordinate system. For the determination of a virtual recording device at a distance of 64 mm from an original recording device, absolute relations are needed, which means that the separation in metres, for example, between two original recording devices or between the selected reference coordinate system and an original recording device must be known. The steps for determining a virtual recording device will now be described (see FIG. 3).

D1. Manual input of the distance ts, in metres (step 301), between the first original recording device of the sequence of original images and the selected reference coordinate system (for example, the spatial centre of gravity of the 3-D reference image points in FIG. 2).

Figure 1:
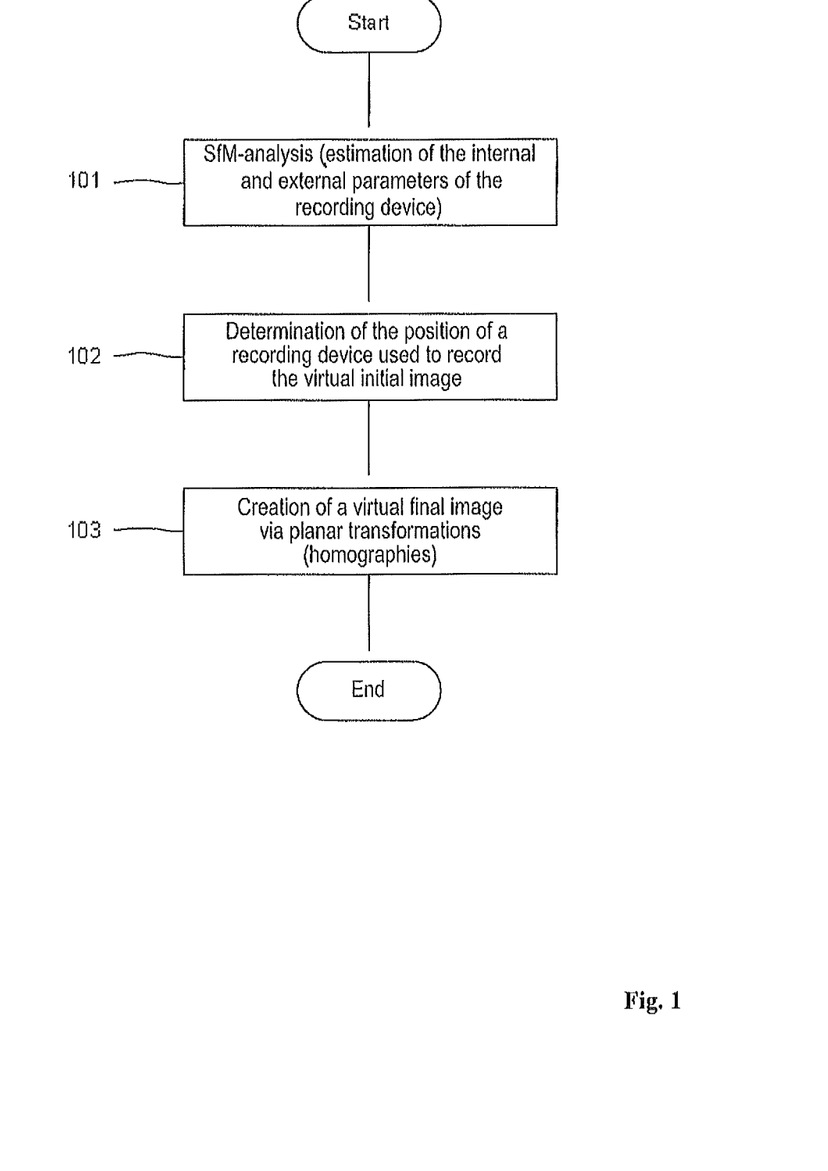
FIG. 1 shows a schematic representation to illustrate the sequence of a method for processing a video data set with original images.
Figure 2:
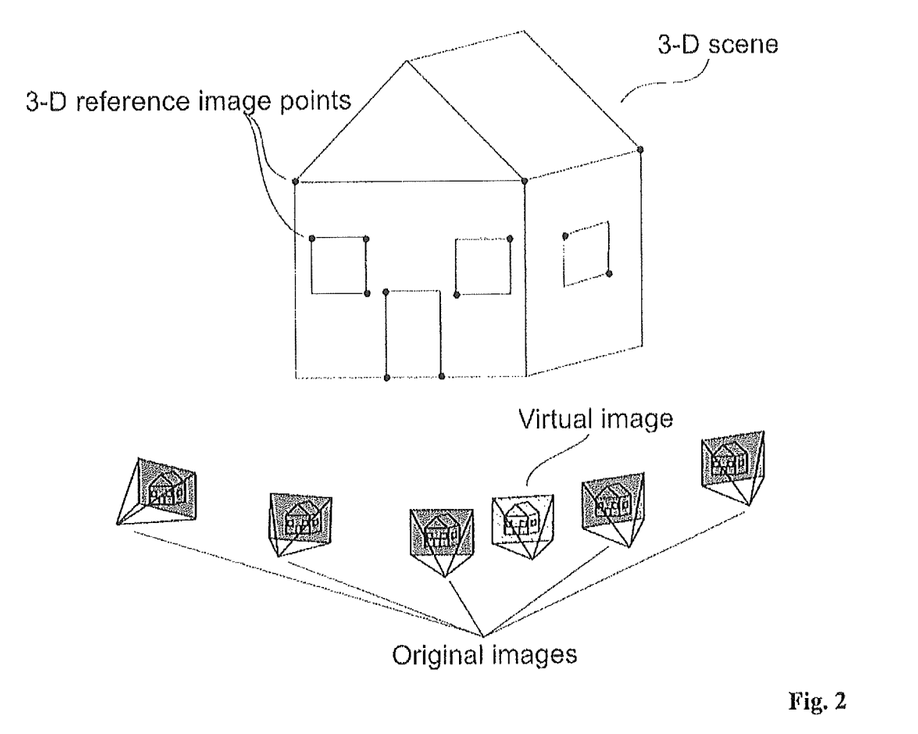
FIG. 2 shows a schematic representation to illustrate an exemplary embodiment for creating a virtual final image recorded with a virtual recording device, starting from a sequence of original images of a 3-D scene recorded with an original recording device.

D2. Normalisation of the positions $C_i$ of the original recording devices to a metric measure within the chosen reference coordinate system using $$C_i^m = t_s \frac{C_i}{\|C_1\|},$$

where $\|C_1\|$ is the Euclidian distance between the origin of the chosen reference coordinate system and the first original recording device (step 302).

D3. Calculation of the positions $C_{i,virtual}^m$ of the virtual recording device $$C_{i,virtual}^m = C_i^m + R_i^{-1} \cdot \begin{bmatrix} \pm n \cdot t_x \\ 0 \\ 0 \end{bmatrix},$$

where $R_i^{-1}$ is the inverse of the rotation matrix $$R_i = \begin{bmatrix} r_{11} & r_{12} & r_{13} \\ r_{21} & r_{22} & r_{23} \\ r_{31} & r_{32} & r_{33} \end{bmatrix}$$

of the original recording device, for which the position of the virtual recording device is determined, and $\pm n \cdot t_x$ is the horizontal distance of the virtual recording device from the original recording device ($\pm n \cdot 64$ mm) to the left or the right (n is the number of generated virtual images in one of the two possible horizontal directions) (step 303).

D4. Calculation of the distances of the virtual recording device $C_{i,virtual}^m$ from all the original recording devices of the video data set $C_i^m$ (step 304).

D5. Inversion of the normalisation for the positions of the virtual recording device $$C_{i,virtual} = \frac{\|C_1\| \cdot C_{i,virtual}^m}{t_s}. \quad \text{(step 305)}$$

(step 305).

D6. Determination of the projection matrices $P_i$ of the original recording devices using $P_i = KR_i[I|-\tilde{C}_i]$ and $P_{i,virtual}$ of the virtual recording devices using $P_{i,virtual} = KR_i[I|-\tilde{C}_{i,virtual}]$, where K is the internal camera matrix with the internal parameters of the original recording device, R, is the rotation matrices of the original recording device, $$I = \begin{bmatrix} 1 & 0 & 0 \\ 0 & 1 & 0 \\ 0 & 0 & 1 \end{bmatrix}$$

the identity matrix and $\tilde{C}_i$ or $\tilde{C}_{i,virtual}$ are the positions of the relevant recording devices in non-homogeneous coordinates (step 306).

E. Generating a Virtual Final Image with Homographies (Step 103)

Reference image elements in the original images $m_k$ (k=1, 2, . . . ; number of reference image elements in the i-th image) on the one hand, and the virtual initial images $m_{k,virtual}$ on the other hand, are related via the homography H. If the distance between the virtual position of the recording device for the virtual initial image and the original position of the recording device for the associated original image is small, then the following applies: $m_k = H_i m_{k,virtual}$.

H is a 3×3 matrix which therefore contains nine entries, and is determined except for a scaling factor. $m_k$ is known from the SfM analysis. $m_{k,virtual}$ is found with the equation $m_{k,virtual} = P_{i,virtual} M_k$ ($M_k$—spatial coordinates of the reference image points or the 3-D reference image points). Thus $H_i$ can be determined, and this can be done with a minimal number of correspondences between four reference image points (see e.g. Hartley et al., "Multiple view geometry", Cambridge University Press, UK, 2003).

Figure 4:
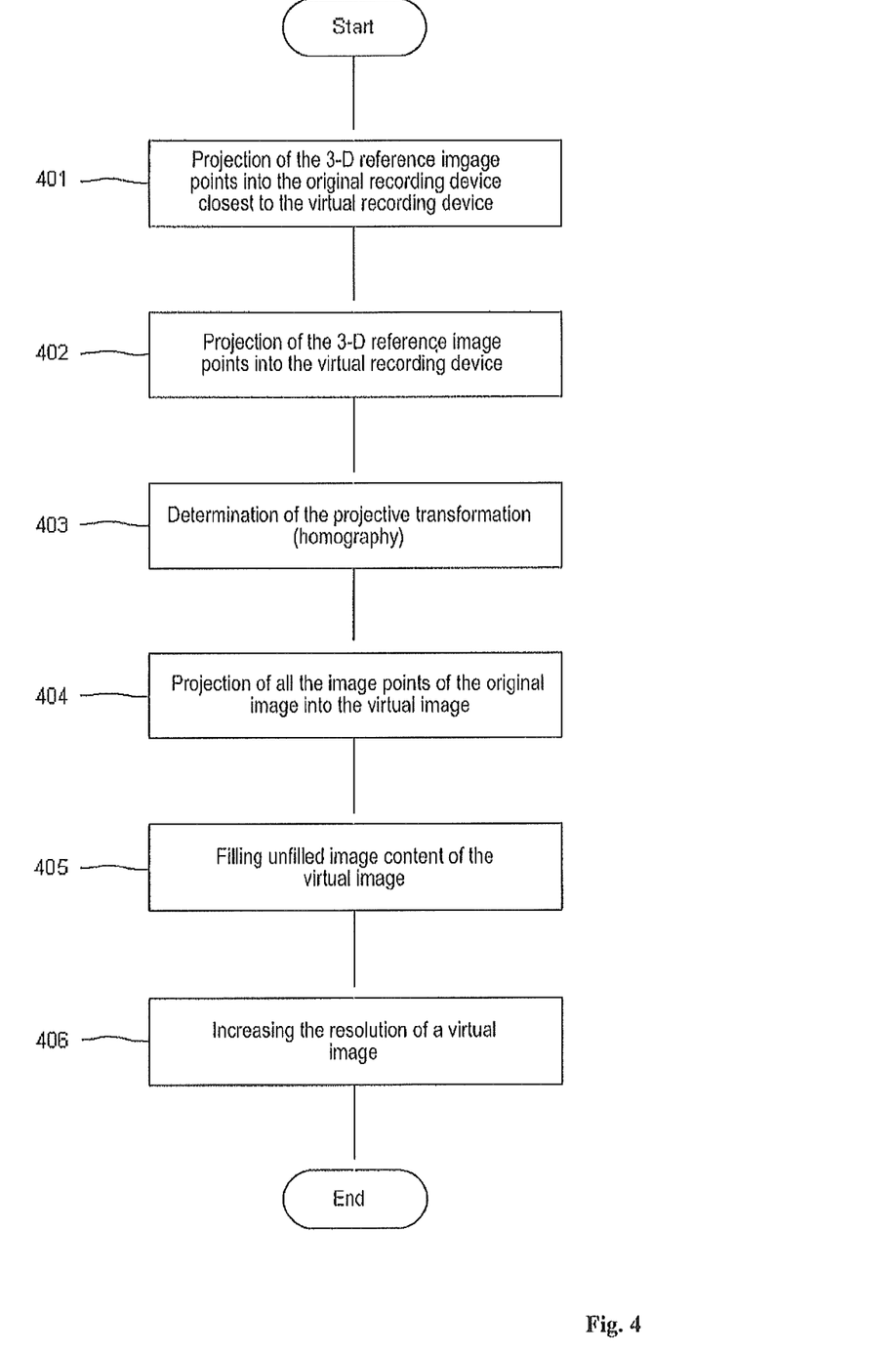
FIG. 4 shows a flow diagram to illustrate a method for creating a virtual final image.

When the homography H between a virtual initial image and the associated original image is known, all the image points/image elements from the original image can then be projected into the associated virtual final image, so that the virtual final image is produced. If the image point pattern does not correspond exactly, a bilinear interpolation of the image point values is carried out. The steps for creating a virtual final image will now be described in detail by reference to FIG. 4 (step 103):

E1. Projection of the 3-D reference image points $M_k$ into the original recording device closest to the virtual recording device using $m_k = P_i \cdot M_k$ (step 401).

E2. Projection of the 3-D reference image points $M_k$ into the virtual recording device using $m_{k,virtual} = P_{i,virtual} \cdot M_k$ to generate a virtual initial image (step 402).

E3. Determination of the homography between the virtual initial image and the original image assigned to the closest original recording device by solving the equation $m_k = H_i \cdot m_{k,virtual}$ (e.g. by minimising a transformation error function (Hartley et al., "Multiple view geometry", Cambridge University Press, UK, 2003) or with the aid of direct linear transformation (Hartley et al., "Multiple view geometry", Cambridge University Press, UK, 2003) (step 403).

E4. Projection of the image points from the original image into the associated virtual initial image using the transformation matrix determined in step E3 where $B_{virtual}(m_{j,virtual}) = B(H_i \cdot m_{j,virtual}) = B(m_j)$ (j=1, 2, . . . , the number of all image points of the original image B associated with the virtual initial image $B_{virtual}$) to generate the virtual final image (step 404).

E5. Repetition of all the steps E1 to E4 for all the virtual final images of the video data set to be generated.

Figure 5:
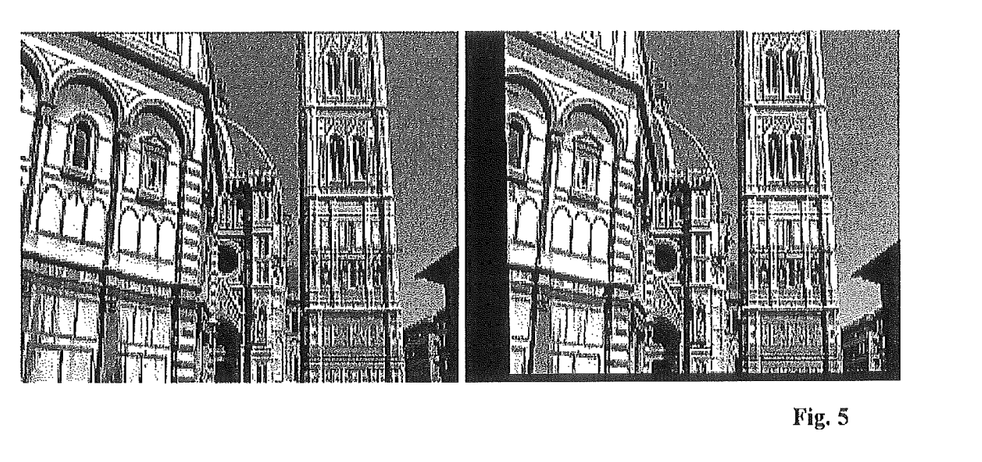
FIG. 5 shows an original image (left) and an associated virtual final image (right) created thereto.

FIG. 5 shows an example of an original image (FIG. 5, left), for which a virtual image is to be generated, and the corresponding virtual final image (FIG. 5, right), which was generated from another original image of the video data set which lay closest to the virtual image.

F. Filling Unfilled Image Content of the Virtual Final Images (Optional) (Step 405)

Figure 6:
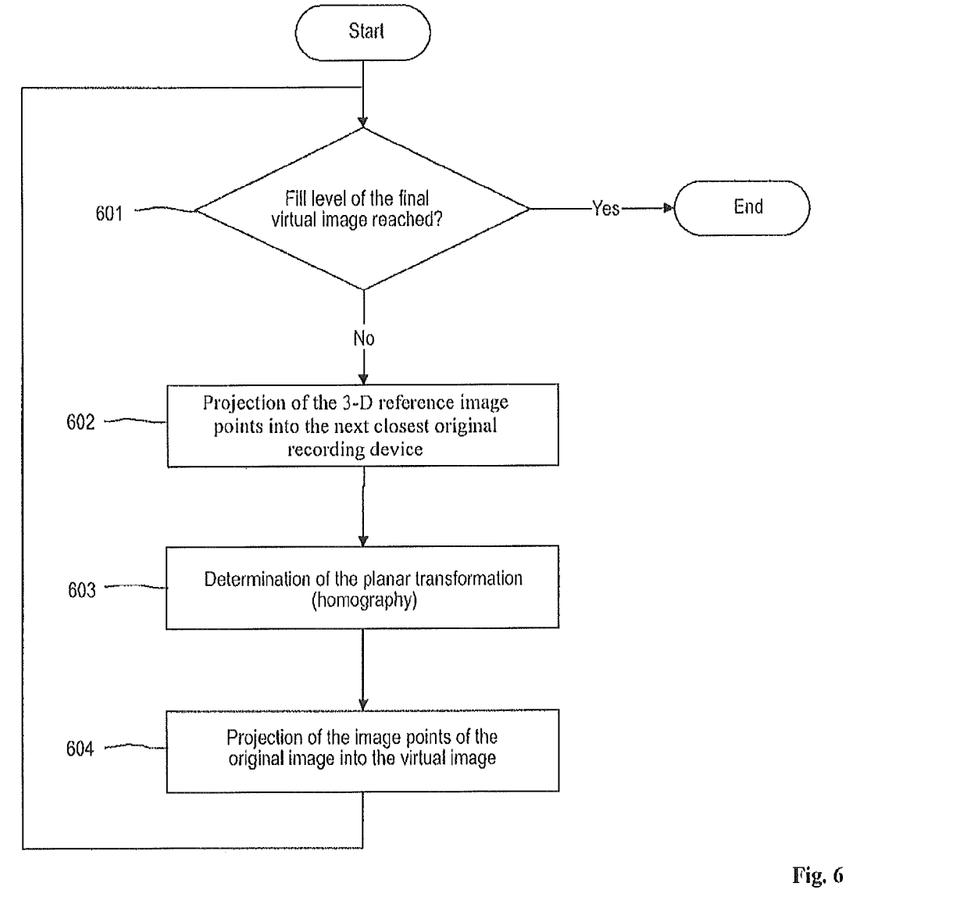
FIG. 6 shows a flow diagram to illustrate a method for filling unfilled image content of virtual final images.

Since the generation of a virtual final image only from the closest lying original image does not always result in a final image that is completely filled with image points (see FIG. 5, right), additional original images from the original recording device must be made use of. The steps for filling unfilled image content (step 601) of the virtual final images will now be described by reference to FIG. 6:

F1. Projection of the 3-D reference image points $M_k$ into the original recording device next closest to the virtual recording device using $m_k = P_{i,new} \cdot M_k$ (step 602).

F2. Determination of the homography between the virtual initial image and the original image assigned to the next closest original recording device, using the equation $m_k = H_{i,new} \cdot m_{k,virtual}$ (e.g. by minimising a transformation error function (Hartley et al., "Multiple view geometry", Cambridge University Press, UK, 2003) or with the aid of Direct Linear Transformation (Hartley et al., "Multiple view geometry", Cambridge University Press, UK, 2003) (step 603).

F3. Projection of still missing image points from the original image into the associated virtual initial image using the transformation matrix $H_{i,new}$ with $B_{virtual}(m_{j,virtual}) = B(m_{i,new} \cdot m_{j,virtual}) = B(m_j)$ (j=1, 2, . . . , number of missing image points of the original image B associated with the virtual initial image $B_{virtual}$) in order to generate the virtual final image (step 603).

F4. Repetition of the steps F1 to F3 until the virtual final image is filled (the degree of filling of the virtual final image is freely selectable) (step 601).

Figure 7:
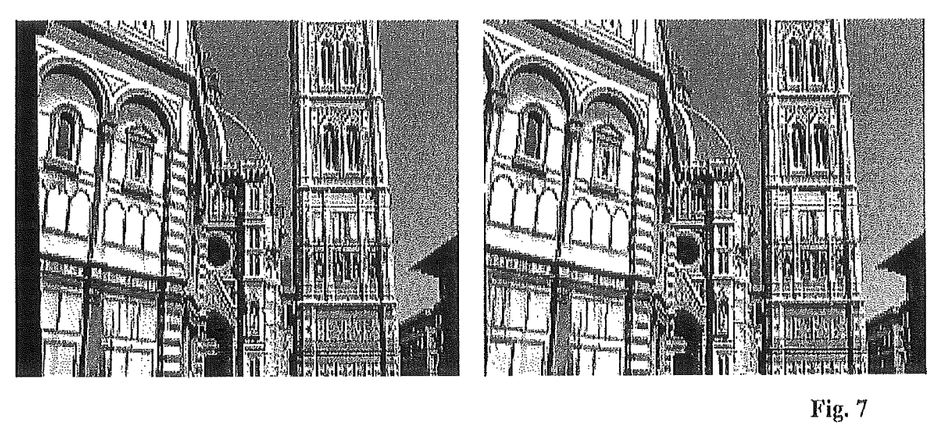
FIG. 7 shows a virtual final image (left) created from 30 original images and a virtual final image (right) created from 62 original images.

FIG. 7 shows an example of a virtual final image (FIG. 7, left) generated from 30 original images from the original recording device and a virtual final image (FIG. 7, right) which was generated from 62 original images from the original recording device, and which was to be generated accordingly into an original image (FIG. 5, left) at an eye separation of 64 mm G. Generating High-Resolution Virtual Images (Optional) (Step 406)

Figure 8:
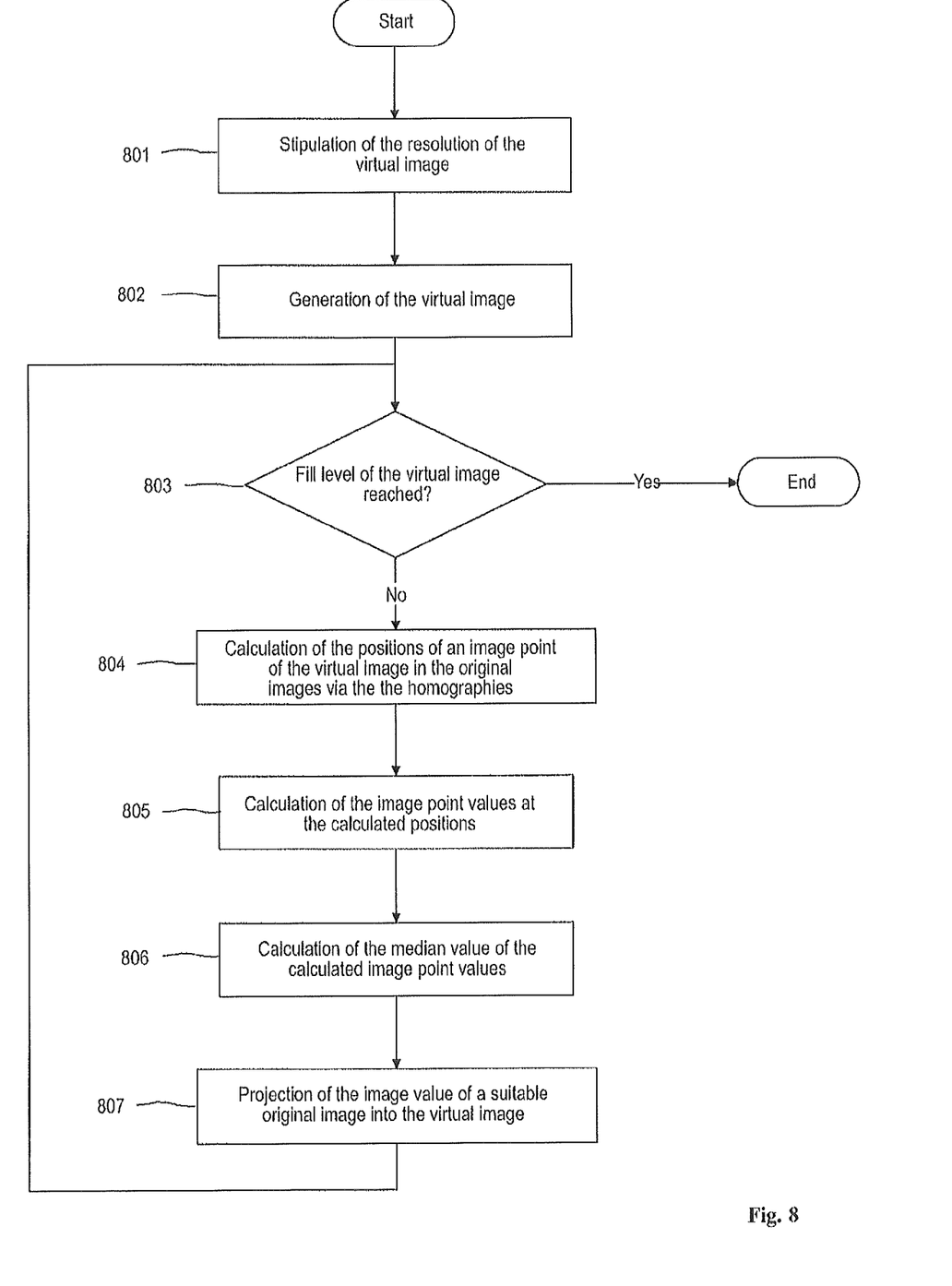
FIG. 8 shows a flow diagram for a method for creating a high-resolution virtual image.
Figure 9:
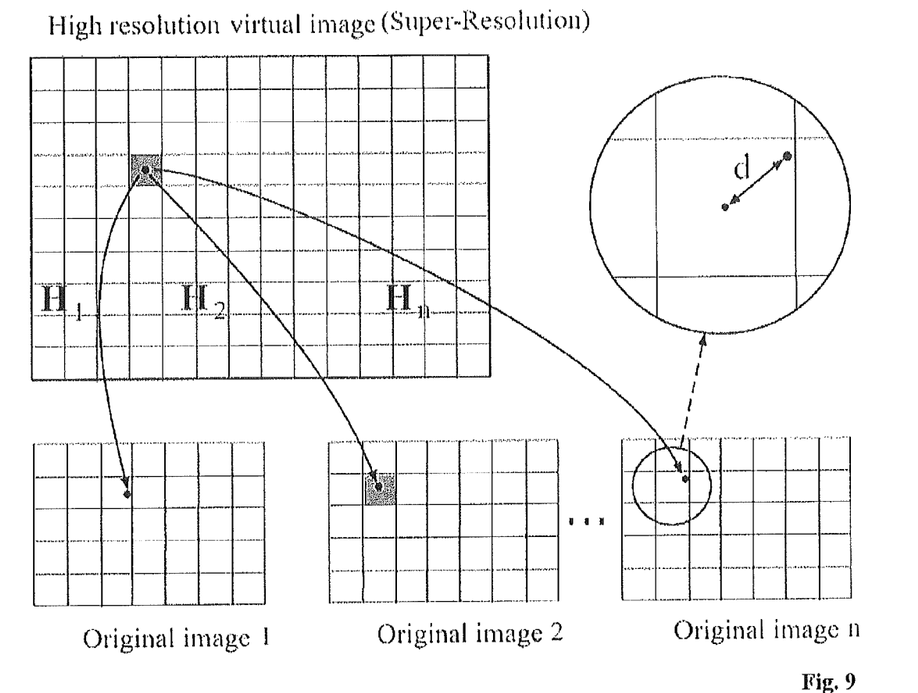
FIG. 9 shows a schematic representation to illustrate the method for creating a high-resolution virtual image.

Since, according to the description in section F above, a plurality of original images from an original recording device can be used for generating a virtual final image, the additional information available from all the original images used to generate the virtual final image can be used to increase the resolution of the virtual final image, which can also be designated 'Super-Resolution'. The steps for generating a high-resolution virtual final image will now be described (see FIGS. 8 and 9):

G1. Generating a virtual final image as described in sections E and F above (steps 401, . . . , 405).

G2. Stipulation of the new resolution of a virtual final image (step 801).

G3. Generation of a virtual initial image with the resolution stipulated in G2 (step 802).

G4. Calculation of the positions of an image point of the virtual initial image from step G3 in the original images used in step 1 by means of the homographies determined in step G1 using $m_l = H_l \cdot m_{virtual}$ (l=1, 2, . . . , number of the original images that were used for generating a virtual final image according to step G1) (step 804).

G5. Calculation of the image point values at the positions in the original images (step 805) calculated in step G4.

G6. Calculation of the median value of the image point values calculated in step G5 using $$B_{med}(m_l) = \underset{\forall l}{\operatorname{median}} B_l(m_l). \qquad \text{(step 806)}$$

G7. Projection of the image point value which is situated within a defined tolerance range around the median value and the position of which lies closest to the image point pattern (FIG. 9, original image 2) (step 807).

G8. Repetition of the steps G4 to G8 until the virtual initial image from step G3 is filled (step 803). The degree of filling is freely selectable.

H. Experimental Investigations

Figure 10:
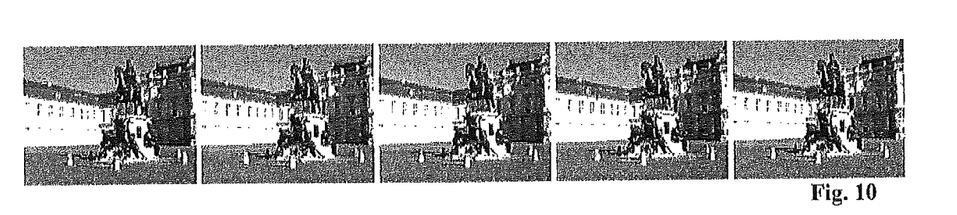
FIG. 10 shows four virtual final images of a 'statue' video data set and the original image in the middle.

FIG. 10 shows four virtual images from a video data set entitled 'Statue', which were generated according to the method described above (at equidistant spacings of 64 mm), and with the original image in the centre.

Table 1 shows the results of experimental investigations making use of the method described above. Different video data sets were investigated, each involving TV transmissions or film recordings with a digital hand-held camera. Alongside the image point resolution, the distance $t_s$ of the spatial centre of gravity of the 3-D scene is also given, in metres. The last column gives the mean number of original images used for generating one virtual image.

TABLE 1

| Video data set | Resolution | Distance $t_s$ in m | Mean number of original images to generate one virtual image |
|---|---|---|---|
| TV transmission | | | |
| Pyramids | 720 × 405 | 8 | 2.13 |
| Vase | 720 × 405 | 5 | 1.69 |
| Cliffs | 720 × 576 | 10 | 3.04 |
| Wall | 720 × 576 | 10 | 10.50 |
| Valley | 720 × 576 | 10 | 14.38 |
| Hand-held camera | | | |
| Medusa | 448 × 358 | 3 | 14.04 |
| Cathedral | 720 × 576 | 8 | 61.24 |
| Facade | 720 × 576 | 6 | 37.11 |
| Statue | 720 × 576 | 8 | 53.70 |
| Church | 576 × 720 | 6 | 8.14 |

Figure 11:
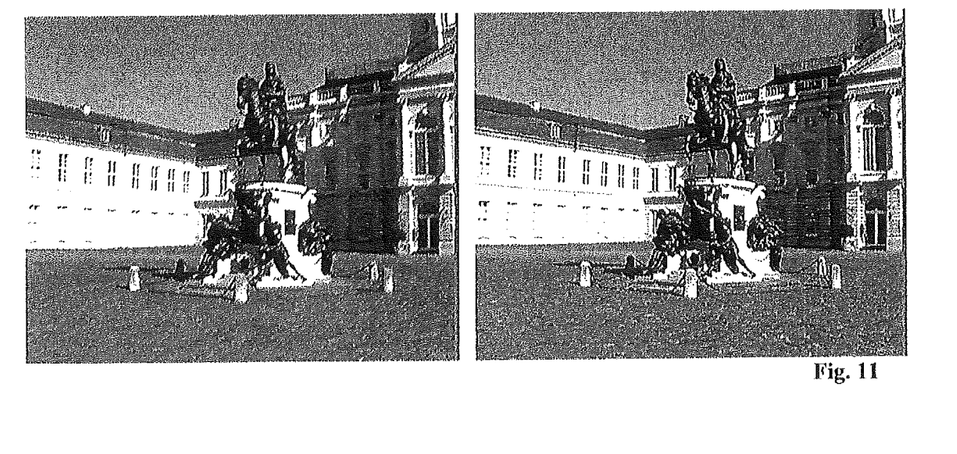
FIG. 11 shows two further virtual final images of the 'statue' video data set wherein the virtual final image has been created on the right side at higher resolution.

FIG. 11 shows the same virtual final image for the video data set 'Statue', which was generated according to the method described above. The right virtual final image in FIG. 11 was generated with the optional method (as described above in section G) in a higher resolution (1080×864 image points) than the resolution of the original images (720×576 image points). For comparison, the left virtual final image in FIG. 11 was generated with the method described in sections E and F (resolution of the virtual final image matches the resolution of the original images of the video data set, 720×576 image points) and subsequently brought to the higher resolution (1080×864) by means of Lanczos filtration.

The features disclosed in the description above, the claims and the drawings can be significant to the realisation of the invention in its various embodiments both individually and in any combination.

The invention claimed is:

1. A method for processing a 2-D video data set, which comprises a sequence of original 2-D images providing a 2-D representation of a scene, into a modified 3-D video data set which, in addition to the sequence of original 2-D images, comprises virtual 2-D images derived therefrom in one or more data processing units, wherein:

an SfM analysis is carried out for each of the original 2-D images and a respectively assigned original position of a recording device which was used to record the original 2-D image, virtual positions are formed for a recording device for recording virtual 2-D images, for each virtual position of the recording device with the associated virtual initial image, a respective assignment is created to at least one of the original positions of the recording device with the associated original 2-D image, for each assignment, a homography is determined between the virtual initial image and the associated original 2-D image, for each virtual initial image, a virtual 2-D final image is formed from the associated original 2-D image in that the original 2-D image is formed into the associated 2-D final image using the respectively determined homography; and a modified 3-D video data set is provided, the modified 3-D video data set comprising pairs of images, each pair of images having an original 2-D image and an associated 2-D final image, thereby forming a 3-D stereoscopic final image, wherein the modified 3-D video data set provides a 3-D representation of the scene.

2. The method according to claim 1, characterized in that the assignments are formed in that at least one laterally closest original position of the recording device with the associated original 2-D image is assigned to each virtual position of the recording device with the associated virtual initial 2-D image.

3. The method according to claim 2, characterized in that the at least one laterally closest original position of the recording device is formed at a lateral distance of an interpupillary distance from the assigned virtual position of the recording device.

4. The method according to, claim 1 characterized in that the virtual positions for the recording device for recording the virtual images are formed at equidistant spacings from the original positions.

5. The method according to claim 1, characterized in that for each of the original positions, a plurality of virtual positions of the recording device is formed which are optionally equidistant from one another.

6. The method according to claim 1, characterized in that the modified 3-D video data set is converted into a modified 3-D video data set with images of increased resolution in that, using the respectively determined homography, from the sequence of original 2-D images and the additional virtual 2-D images, a sequence of images with increased resolution is generated, said resolution being higher than an original resolution of the original 2-D images and the additional virtual 2-D images.

* * * * *